(12) United States Patent
Faieta (10) Patent No.: US 11,932,495 B2
(45) Date of Patent: Mar. 19, 2024

(54) ROBOTIC UNSCRAMBLER

(71) Applicant: Fameccanica.Data S.p.A., San Giovanni Teatino (IT)

(72) Inventor: Fabrizio Faieta, San Giovanni Teatino (IT)

(73) Assignee: Fameccanica.Data S.p.A., San Giovanni Teatino (IT)

(*) Notice: Subject to any disclaimer, the term of this patent is extended or adjusted under 35 U.S.C. 154(b) by 0 days.

(21) Appl. No.: 17/683,800

(22) Filed: Mar. 1, 2022

(65) Prior Publication Data

US 2022/0371830 A1 Nov. 24, 2022

(30) Foreign Application Priority Data

Mar. 9, 2021 (EP) ..................................... 21161594

(51) Int. Cl.
*B65G 47/14* (2006.01)
*B65G 47/90* (2006.01)

(52) U.S. Cl.
CPC ....... *B65G 47/1492* (2013.01); *B65G 47/905* (2013.01); *B65G 2203/0225* (2013.01); *B65G 2203/0233* (2013.01)

(58) Field of Classification Search
USPC ........................................................ 198/382
See application file for complete search history.

(56) References Cited

U.S. PATENT DOCUMENTS

| 9,428,344 B2 | 8/2016 | Donna et al. |
| 10,618,750 B2 * | 4/2020 | Brucker ................. B60L 13/03 |
| 2019/0161292 A1 | 5/2019 | Brucker et al. |

FOREIGN PATENT DOCUMENTS

| CN | 201023989 | 2/2008 |
| CN | 106628974 A | 5/2017 |
| CN | 109835686 A | 6/2019 |
| EP | 3489175 A1 | 5/2019 |
| JP | H06255758 A | 9/1994 |
| JP | 2006256744 A | 9/2006 |
| WO | 2019082111 A1 | 5/2019 |
| WO | 2019179685 A1 | 9/2019 |

OTHER PUBLICATIONS

European Search Report dated Aug. 18, 2021. 6 pages.
Chinese Office Action dated Apr. 27, 2023. 10 pages.

* cited by examiner

*Primary Examiner* — William R Harp
(74) *Attorney, Agent, or Firm* — RMCK Law Group PLC (57) ABSTRACT

Disclosed herein is a robotic product unscrambler apparatus which is capable of operating with ultra high efficiency and with minimum environmental impact. Efficiency and energy saving are achieved thanks to the possibility of processing products regardless of their preliminary orientation, so to remit sorting of the products to a subsequent unscrambling device of the product unscrambler. This results in the substantial absence of non-processed products due to preliminary orientation reasons, and accordingly very little—if at all—energy input to recirculate non processed products.

15 Claims, 6 Drawing Sheets

ROBOTIC UNSCRAMBLER

CROSS-REFERENCE TO RELATED APPLICATION

This application claims priority to European Patent Application No. 21161594.3 filed Mar. 9, 2021.

FIELD OF THE INVENTION

The present invention relates to automated processing of bottle containers, particularly to the automated handling and positioning of bottle containers to present them with a predetermined orientation (the so called "unscrambling") to subsequent processing stages.

PRIOR ART

Bottle containers used in the packaging of common use products such as, for instance, liquid home cleaning spray products or gardening products, foodstuff products, personal care products, are often manufactured with non-symmetric shapes and/or offset necks—usually threaded necks, for instance to accommodate shape features such as handles or grips, and/or due to functional reasons, or else due to packaging design choices.

Whatever the reason that results in the final shape of the bottle container, when the containers come out of moulding or forming stages they are fed to subsequent processing stages with a random orientation, for instance they are fed via conveyors whereon the containers lay on one of their lateral surfaces (this due to the impossibility to feed bottle containers in upright position with a feed rate that is acceptable to industrial standards). Prior to transferring the containers to advanced processing stages such as filling, closure, labelling, etc. the same have to be arranged according to a predetermined, fixed orientation (the so called "unscrambling") in order for the processing machines downstream to operate with no need for container-to-container adjustment due to non-uniform container orientation.

Figure 1:
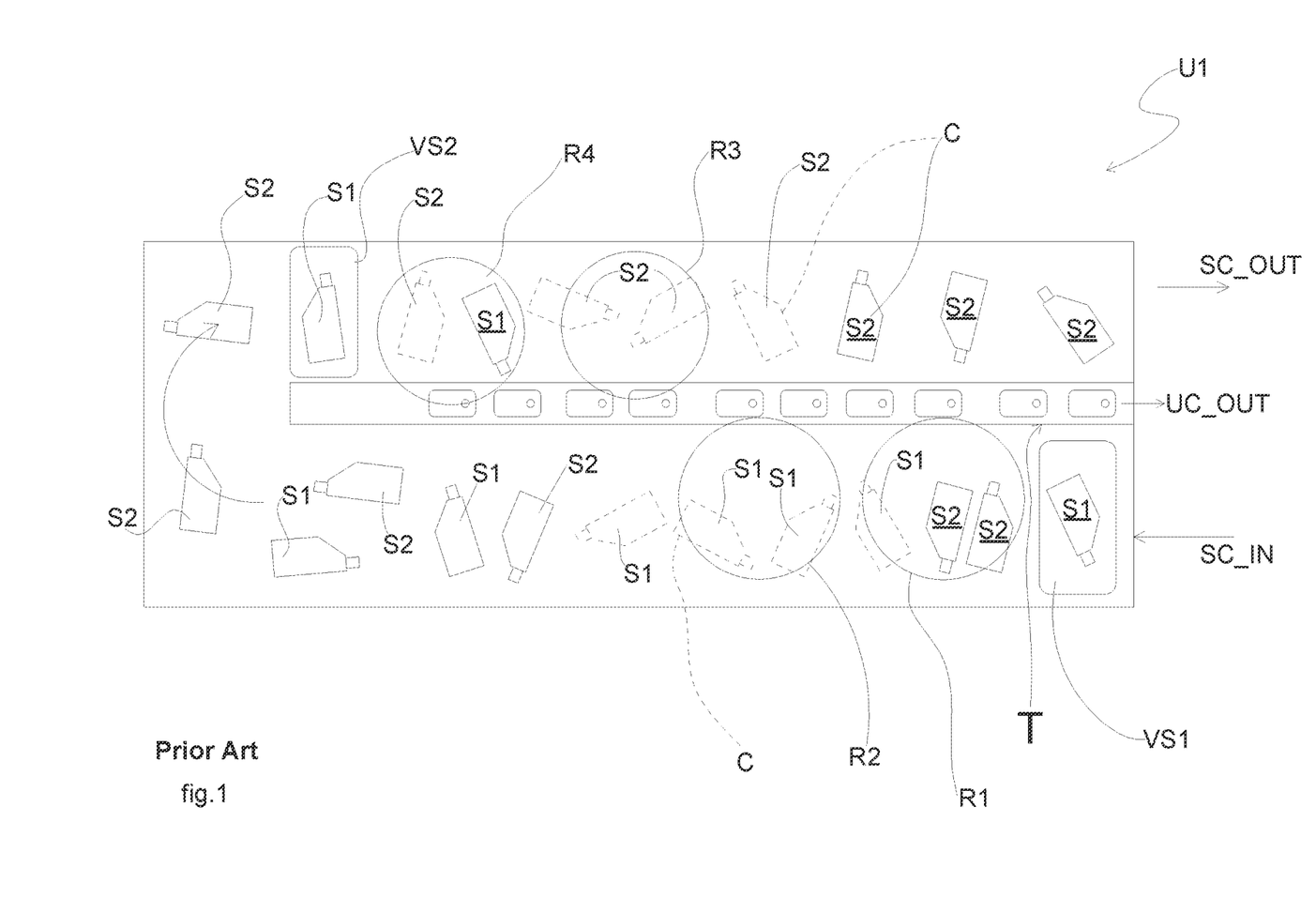
FIG. 1 is a schematic representation of a first prior art robotic unscrambler

A first prior art solution is schematically represented in FIG. 1. A robotic unscrambler U1 includes four handling robots R1, R2, R3, R4 arranged pairwise on opposite sides of an output conveyor T, whereby robots R1 and R2 are arranged on a first side of the conveyor T, while robots R3 and R4 are arranged on a second, opposite side of the conveyor T. Randomly oriented ("scrambled") containers enter the unscrambler U at a location identified by reference SC_IN (with the direction identified by the arrow, which also indicates the flow of scrambled containers C) which is upstream of the robots R1-R4, and wherein robots R1, R2 are exposed first to the flow of scrambled containers, while robots R3, R4 are exposed second to the flow of scrambled containers.

The latter extends over a U-shaped path which is wound around the output conveyor T path, which in turn begins among the handling robots R1-R4 and ends at a product output location UC_OUT (the direction of the arrow is representative of the products flow). In other words, the two paths are partly compenetrated so that a first portion of the conveyor T path becomes the drop off area for the robots R1-R4, whilst the U-shaped path of the scrambled containers provides picking locations for the handling robots R1-R4.

Just prior to the robots R1 and R2 a vision system V is arranged which is configured to frame the containers moving along the U-shaped path of the flow of scrambled containers and control the handling robots R1-R4 to pick up a scrambled container from the flow, rotate it upright and with the neck at a specified position (leading neck/trailing neck—depending on the needs).

To better understand what kind of drawbacks such a prior art solution comes with, reference shall be made to a largely used asymmetric bottle container, i.e. a bottle containers for non-pressurized spray products (sprayer bottles). The bottle containers, while being all randomly oriented coming out of the forming station, are all lying on either of the large, drop shaped, lateral sides herein named—for description purposes—S1 and S2. Accordingly, a container may be presented to the handling robots either side S1 up (hence resting on side S2) or side S2 up (hence resting on side S1). The predetermined orientation at the product output UC_OUT requires that all of the containers be oriented with sides S1 on one and the same side of the output direction UC_OUT, and sides S2 on one and the same side of the output direction UC_OUT, whereby all of the containers move either with a leading neck (i.e. the neck leading in the direction of motion) or a trailing neck (i.e. the neck trailing in the direction of motion).

The person skilled in the art will readily appreciate that such positioning requires additional rotation operations by the handling robots R1-R4 if the picking of the container by the up (exposed) side results in a preliminary positioning (i.e. prior to final adjustment rotation around the container axis) where from setting the neck at the required leading or trailing position would require an additional half spin of the container itself around its axis. Performing the additional half spin is not compatible with processing rates required by the industry, so that robots R1, R2 only process containers with side S1 up, while robots R3, R4 only process containers with side S2 up, meaning that containers that remain unprocessed by robots R1-R2 cannot be processed by robots R3-R4. This is a great disadvantage when—for instance—an unusually high share of containers comes randomly oriented one and the same side up. This results in lack of efficiency due to the need for providing a recirculation path from SC_OUT to SC_IN which recirculates non processed containers. Non processing of the containers may be the result of a mismatch in the orientation of the container and the handling robot (wrong side up as compared to the robot) possibly combined with a feeding rate of the containers which exceeds the maximum processing rate of the robots.

Figure 2:
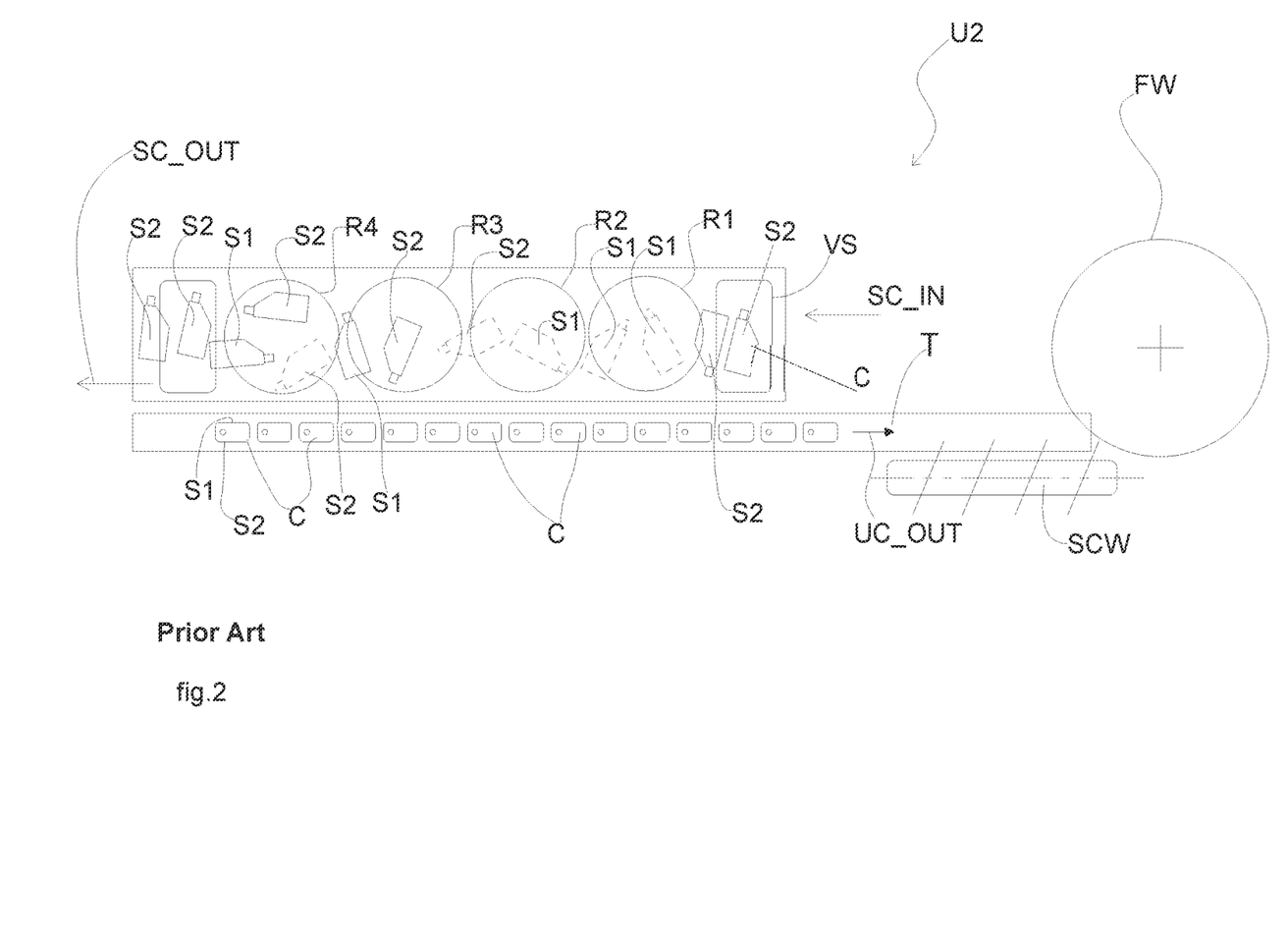
FIG. 2 is a schematic representation of a second prior art robotic unscrambler

With reference to FIG. 2, a further prior art solution is designated by reference number U2. Unlike the unscrambler U1, the conveyor T extends along a rectilinear direction and the handling robots R1-R4 are all located on one and the same side of the conveyor T, with a single vision area VS upstream of the array of handling robots R1-R4 (or else a vision system for each pair of handling robots on either side of the conveyor T) with reference to the direction of flow of the scrambled containers C, which is identified by the arrows SC_IN and SC_OUT. The flow direction of the scrambled containers C and the flow directions of the unscrambled containers C coming out of the conveyor T are opposite to one another and the product output UC_OUT is arranged at the inlet of a screw conveyor SCW configured to transfer the unscrambled containers C to, for instance, the wheel FW of a filling station.

Each of the handling robots R1-R4 operates as described in the foregoing, i.e. it is configured to pick (guided by the vision system VS), rotate upright and position the scrambled containers C according to the desired leading neck or trailing neck position, so to assemble the unscrambled containers flow coming out of the conveyor T.

The inherent problem with the unscrambler U2 is the same as with the unscrambler U1: the handling robots can only process containers with a predetermined side up (S1 or S2 depending on the final desired position). Accordingly, the efficiency of the unscrambler U2 is largely cut down by the need for a recirculation path from SC_OUT to SC_IN with a re-scrambling of the non processed containers C, so that at least a fraction of them may eventually come to rest on the side opposite to that it rested during the "idle" pass under the robots R1-R4, and accordingly be processed by one of the robots R1-R4.

Outside of reducing the overall efficiency of the manufacturing process, this also results in a very low energy efficiency of the unscrambler U2, essentially in that a large share of the energy input is drained by recirculation of non-processed containers.

OBJECT OF THE INVENTION

The object of the invention is to solve the technical problems mentioned in the foregoing. More specifically, the object of the invention is to provide a robotic unscrambler capable of operating with high efficiency, preferably 100% efficiency, without requiring enhancements of the handling robots, nor more complex handling robots overall, regardless of the initial orientation of the scrambled containers and regardless of the final orientation of the unscrambled containers.

SUMMARY OF THE INVENTION

The object of the invention is achieved by a robotic unscrambler and a related method of unscrambling having the features of the appended claims, which form an integral part of the technical disclosure herein provided in relation to the invention.

BRIEF DESCRIPTION OF THE FIGURES

Further features and advantages of the invention will become apparent from the following description with reference to the annexed figures, given purely by way of non-limiting example, wherein.

DETAILED DESCRIPTION

Reference number 1 in FIGS. 3 and 4 designates as a whole a robotic unscrambler apparatus (hereinafter referred to as "unscrambler") according to embodiments of the invention.

The unscrambler 1 comprises a product picking area 2, a transfer conveyor 4, and a product unscrambling device 6.

The product picking area 2 is configured to receive a flow SCF of scrambled products C to be processed by one or more handling devices arranged at the product picking area 2. The scrambled products C enter from a scrambled products input SC_IN which may correspond, for instance, to the output of a conveyor which transfers the product from a station upstream the unscrambler 1, typically a product forming station.

Figure 3:
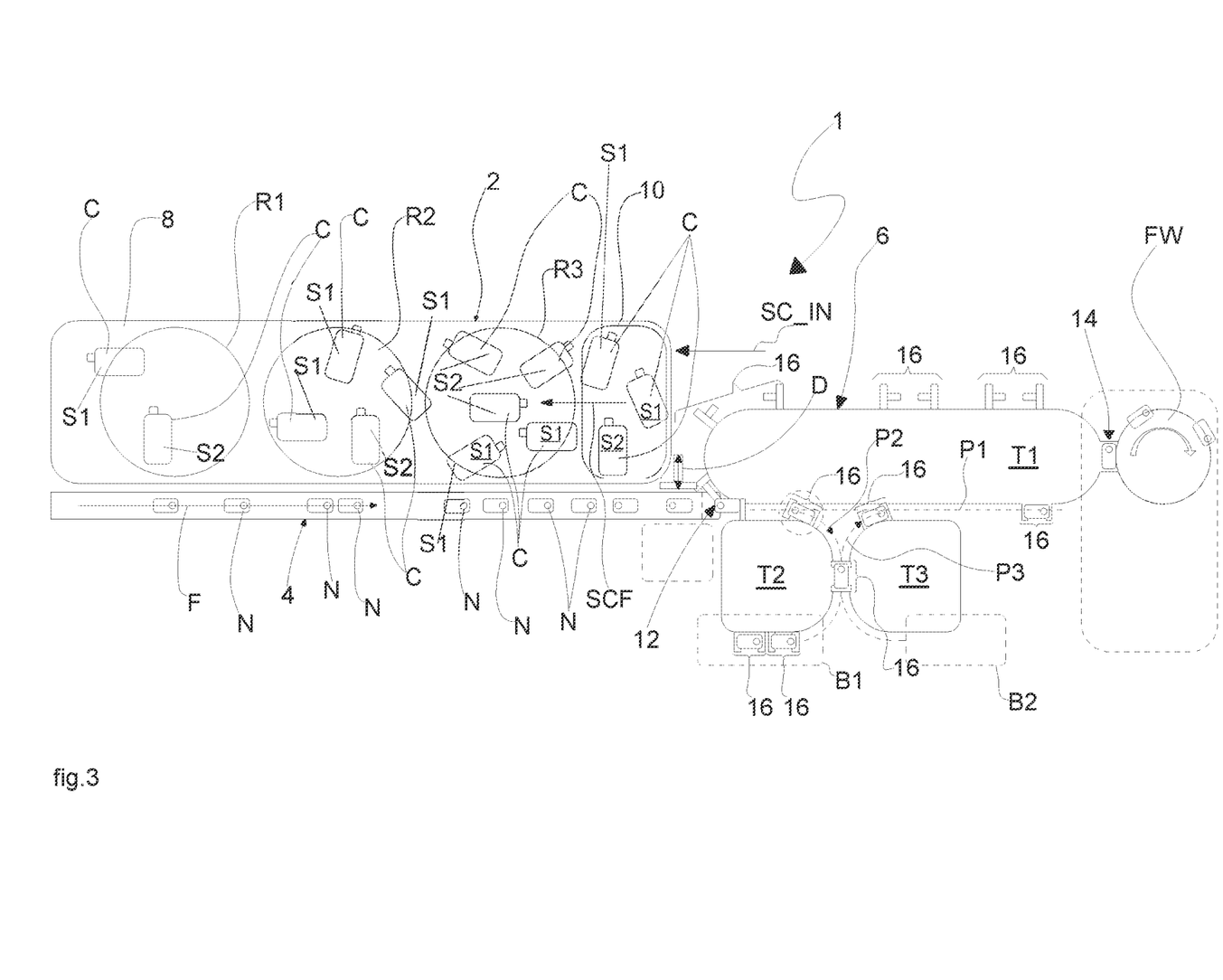
FIG. 3 is a schematic representation of a robotic unscrambler according to embodiments of the invention in a first operating condition.
Figure 4:
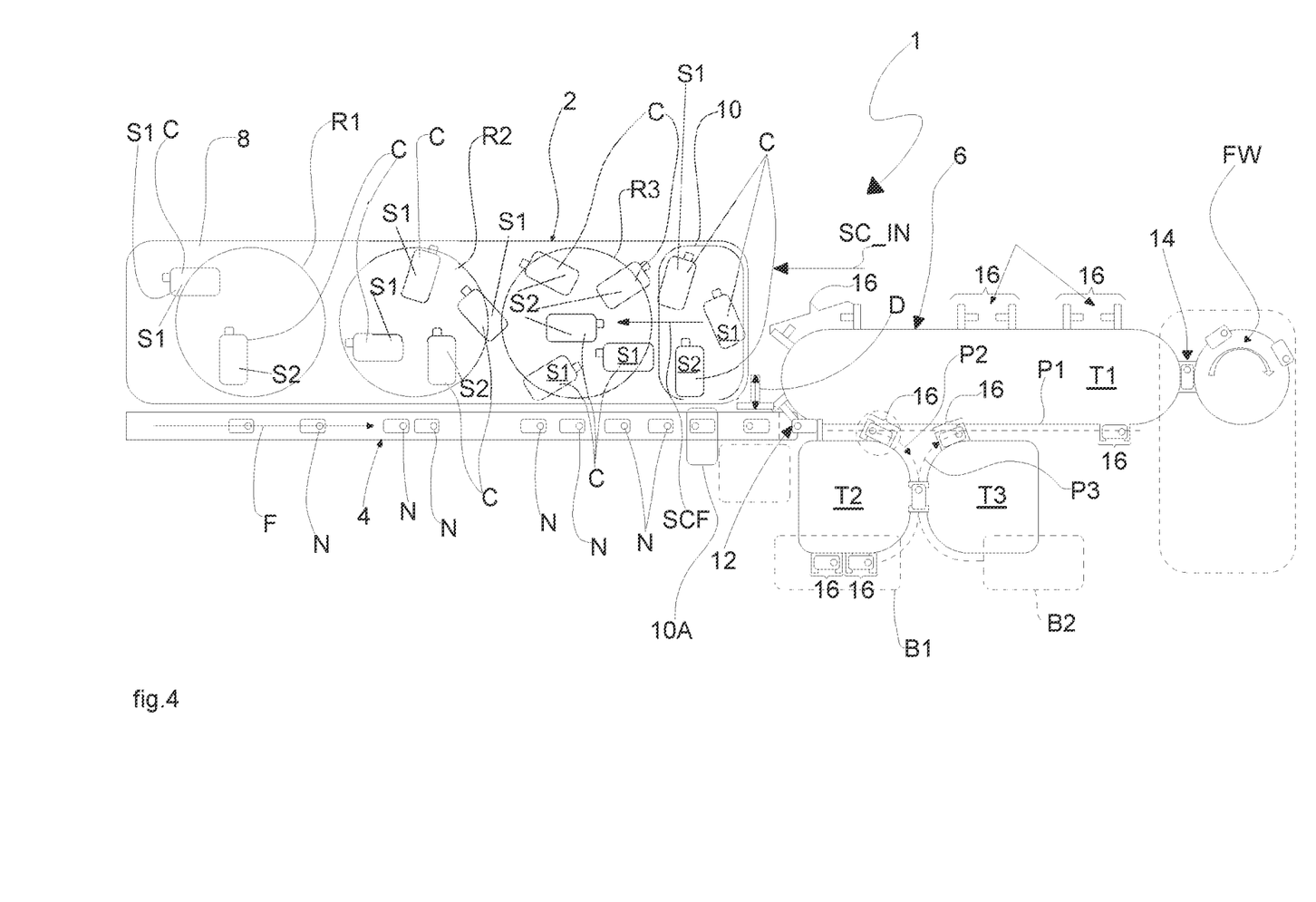
FIG. 4 is a schematic representation of a robotic unscrambler according to further embodiments of the invention in a second operating condition.

In the embodiment shown in FIGS. 3 and 4, the product picking area comprises a linear array of three handling robots R1, R2, R3 in an overhead position with respect to a product input conveyor 8, which carries the scrambled products C beneath the robots R1-R3 as the flow SCF (reference SCF is also associated to an arrow indicating the flow direction). The robots R1, R2, R3 may be, for example, overhead pick and place robots with an end effector configured as a gripper and mounted on an articulated, wrist-like joint that allows a certain extent of spatial rotation of the product C picked by the robot.

A vision system 10 is provided upstream of the linear array of the robots R1, R2, R3 and is configured to frame the scrambled products C in flow SCF to retrieve position and orientation information of the products C in order to assist with the guidance of the robots R1, R2, R3.

The transfer conveyor 4 is configured to receive scrambled products C picked from the product picking area 2, particularly picked by the robots R1, R2, R3 (or in general by the handling device(s) installed at the product picking area 2) and released at the transfer conveyor 4 by the one or more handling devices/robots. The products on the transfer conveyor 4 move along a feed direction F that is determined by the conveyor motion, and that in the embodiments represented in the figures is parallel and opposite to the scrambled products input flow SCF.

It is to be noted, in this latter regard, that the products C are scrambled both at the product picking area and product transfer conveyor. The extent of the scrambling is different, and in particular the products at the product picking area 2 have a larger degree of scrambling than the products at the transfer conveyor 4. That is, the products entering the area 2 are randomly laid on the product input conveyor 8, while the products C on the conveyor 4 are at least positioned so to have a uniform upright orientation, although the overall orientation of the product batch is still scrambled.

Scrambling of the products C may be regarded as a deviation from a desired orientation which depends on the further processing the products C are to undergo downstream of the unscrambler 1.

The desired orientation is defined based on reference geometric features of the products C and with respect to the feeding direction F, which is the direction along which the scrambled products C move towards (and are presented to, accordingly) further processing stages.

In the embodiments represented in the figures herein, the products C are bottle containers (e.g. polymer, injection- or blow-molded containers or glass containers) with an offset neck N, wherein the neck N is offset with respect to a longitudinal axis of the container C.

The offset of the neck N allows the identification of a first surface S1 and a second surface S2, opposite to one another, which determine two different orientations of the container C based on whether the surfaces S1 and S2 face left or right of the feeding direction F when the container is on the transfer conveyor 4, and particularly when the container C lies on the conveyor 4 on a third surface (typically a base surface) which is other than the surfaces S1, S2. The neck N and/or the surfaces S1, S2 may be the reference geometric features mentioned in the foregoing. In general, whatever the product handled by the unscrambler 1, candidate reference geometric features may be all the features which either represent a geometric singularity at a certain location (the neck N for instance introduces a geometric singularity in that it sticks out of the container surface) and/or have a position such that a certain degree of asymmetry or non-symmetry is introduced into the product shape (for instance, a chamfer or a slope opposite the neck N, or the drop-like shape of surfaces S1, S2), whereby the disparate possible positions of the reference geometric feature(s) with respect to a reference direction—which in the unscrambler 1 may be conveniently chosen as the feeding direction, as said— determine different orientations of the product. Taking the bottle containers schematically represented herein as a reference example, the position of the surfaces S1, S2 relative to the feed direction F determines whether the bottle container C moves along the feed direction F with a leading neck orientation (i.e. the neck N leads while the container moves along the direction F) or a trailing neck orientation (i.e. the neck N trails while the container moves along the direction F).

The product unscrambling device 6 includes a product input 12 and a product output 14 and is configured to receive scrambled products C from the transfer conveyor 4 along the feeding direction F at the product input 12. The product unscrambling device 6 comprises a plurality of carriers 16 configured to take over, carry through the product unscrambling device 6, and release the products C coming from the transfer conveyor 4, whereby the products C are—subject to differentiated handling based on the orientation, as will be detailed in the following—transferred to from the product input 12 to the product output 14 and unscrambled in the process, so that the release of the products C at the output 14 onto a the wheel/carousel FW of a filling machine occurs with the products sorted based on a desired orientation which may be determined, e.g., by the features of the processing facilities downstream of the output 14 (the filling machine in this case).

A product discard device D is arranged along the conveyor 4 upstream of the product input 12 to discard faulty products early detected by the vision system 10. Note also, with reference to FIG. 4, that a second—auxiliary—vision system 10A may be provided at the transfer conveyor 4 just upstream of the discard device D to detect faulty products C while the same are moving on the conveyor 4 in the feed direction F, so that the product discard device D can be operated without relying on the processing resources of the vision system 10.

Figure 5:
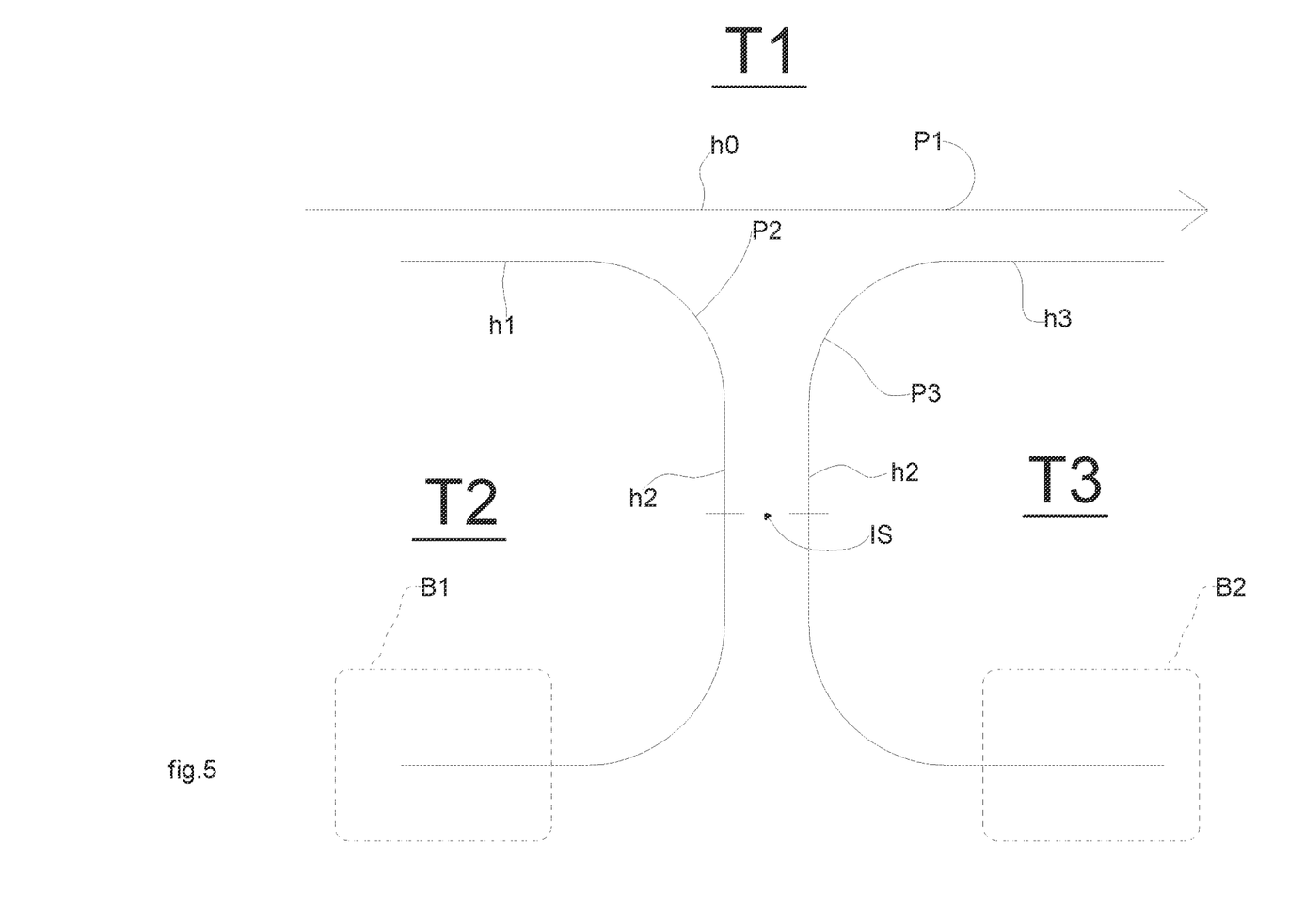
FIG. 5 is a schematic representation of operational paths of the robotic unscrambler according to embodiments of the invention.

According to embodiments of the invention, and referring to FIG. 5 in combination with FIGS. 3 and 4, each of the carriers 16 can be selectively routed to a first path P1, a second path P2, and a third path P3 in order to selectively perform a feed through (FIG. 4) or an unscrambling (FIG. 3) of each product. The carriers 16 and the paths P1, P2, P3 may conveniently be provided as electromagnetically driven carriers selectively engageable—via magnetic coupling— onto the paths P1, P2, P3 provided as electromagnetic tracks on supporting frames T1, T2, T3. An example of such a system is provided by commercial products such as the ACOPOStrak system.

The first path P1 extends from the product input 12 to the product output 14, whereby a carrier 16 routed to the first path P1 is configured to carry a product C having a first, desired, orientation through the product unscrambling device 6 and release the same at the product output 14 thereof. The first path preferably extends linearly along a feed through direction h0, which in the embodiments depicted in FIGS. 3 to 5 is aligned with the feed direction F.

The second path P2 extends as a transition from a first direction h1 of the products C at the product input to a second direction h2, incident to the first direction, wherein the second path P2 includes an interchange station IS to the third path P3 at the second direction h2. According to the invention a carrier 16 routed to the second path P2 carries a product C having a second, undesired, orientation.

The third path P3 extends as a transition from the second direction h2 to a third direction h3 at the product output 16, the third direction h3 being incident to the second direction h2. A carrier routed to the second path P2 and carrying a product C having a second, undesired, orientation is configured to be routed to the third path P3 at the interchange station IS so to present the product C at the product output 16 with the first, desired, orientation.

In preferred embodiments, the third direction h3 is aligned with the first direction h1. Even more preferably, in addition to the alignment of directions h3 and h1 the first direction h1 is aligned to the feed through direction h0, which is in turn preferably aligned with the feeding direction F of the transfer conveyor transfer conveyor 4.

Yet further, in the preferred embodiments referred to in the foregoing, the second direction h2 is orthogonal to the first direction h1, and—accordingly—the second direction h2 is orthogonal to the third direction h3.

In embodiments of the invention, and particularly in the preferred embodiments referred to in the foregoing, the second path P2 comprises a path extension from the interchange station IS to a first buffer area B1. Preferably, in combination with or in alternative to this, the third path P3 comprises a path extension from the interchange station IS with the second path to a second buffer area B2. Each path extension is configured such that the extended second and third path are U-shaped, and the path extensions divert from one another downstream of the interchange station IS, to avoid interference between the carriers 16 directed to buffer areas B1, B2.

Figure 6:
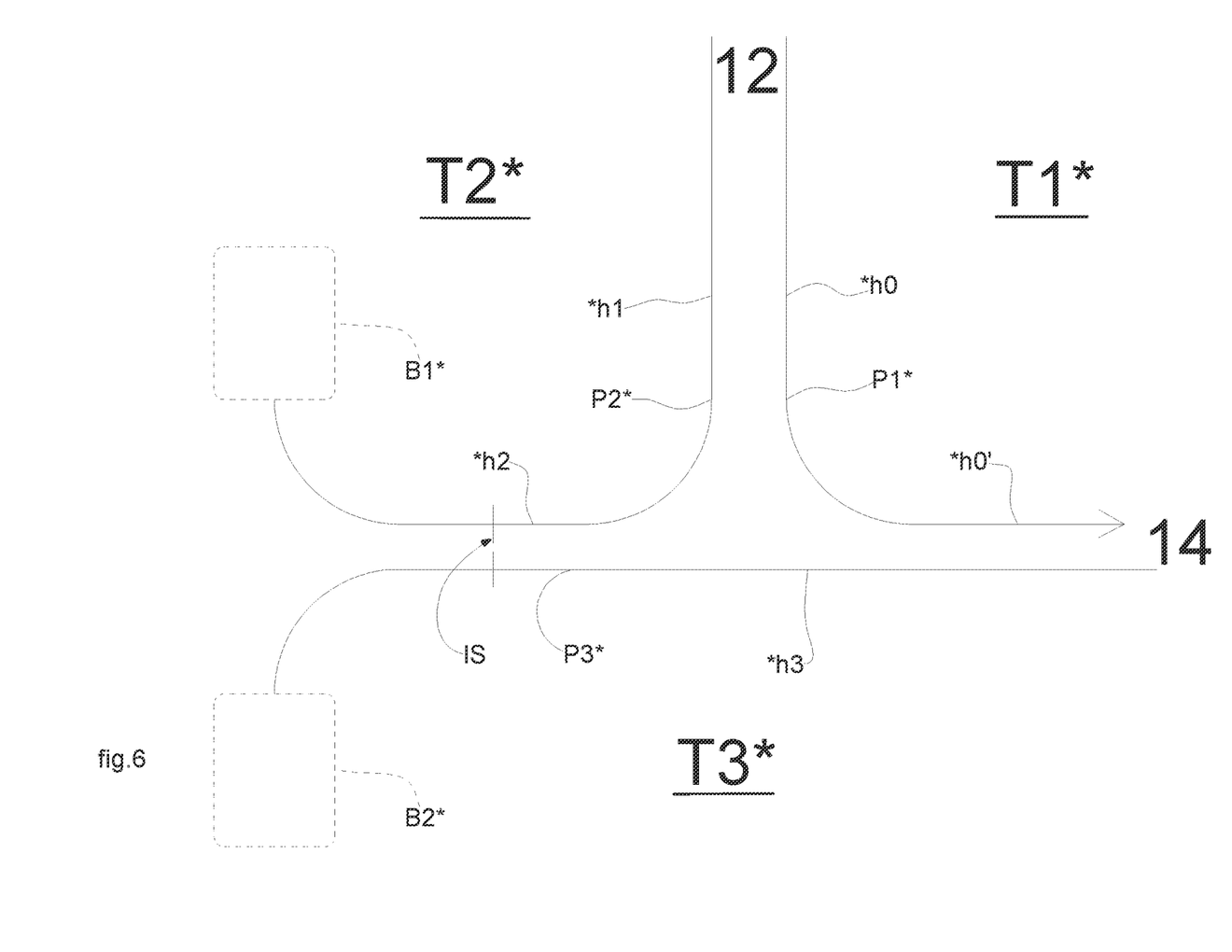
FIG. 6 is a schematic representation of operational paths of the robotic unscrambler according to further embodiments of the invention.

According to further embodiments of the invention, and referring to FIG. 6, the path layout of the unscrambling device 6 may be arranged so that the first path no longer extends along a rectilinear trajectory as it is, instead, in the embodiments of FIG. 5, but rather extends from the product input 12 to the product output 14 as a transition from an input direction *h0 to an output direction *h0' which is orthogonal to the input direction.

Similar to the embodiments of FIG. 5, each of the carriers 16 can be selectively routed to a first path P1*, the second path P2*, and the third path P3* in order to selectively perform a feed through (path P1) or an unscrambling (paths P2*-P3*) of each product.

The carriers 16 and the paths P1*, P2*, P3* may— again—conveniently be provided as electromagnetically driven carriers selectively engageable—via magnetic coupling—onto the paths P1*, P2*, P3* provided as electromagnetic tracks on the supporting frames T1*, T2*, T3*. An example of such a system is provided by commercial products such as the ACOPOStrak system.

The first path P1* extends from the product input 12 to the product output 14, whereby a carrier 16 routed to the first path P1* is configured to carry a product C having a first, desired, orientation through the product unscrambling device 6 and release the same at the product output 14 thereof.

The second path P2* extends as a transition from a first direction *h1 of the products C at the product input 12 (preferably aligned with the input direction *h0) to a second direction *h2 orthogonal to the first direction, and again includes an interchange station IS to the third path P3* at the second direction *h2. A carrier 16 routed to the second path P2* carries a product C having the second, undesired, orientation.

The third path P3* extends, in these embodiments, as a transition from the second direction *h2 to a third direction *h3 at the product output 16, wherein the third direction *h3 is aligned to the second direction *h2.

A carrier routed to the second path P2* and carrying a product C having a second, undesired, orientation is configured to be routed to the third path P3* at the interchange station IS so to present the product C at the product output 16 with the first, desired, orientation.

In preferred embodiments, the feed through direction *h0 is aligned with the feeding direction F of the transfer conveyor 4.

Similar to the embodiments of FIG. 5, the second path P2* comprises a path extension from the interchange station IS to a first buffer area B1*. Preferably, in combination with or in alternative to this, the third path P3* comprises a path extension from the interchange station IS with the second path to a second buffer area B2*. The path extension leading to the buffer area B1 is configured such that the extended second path is U-shaped, while the path extension leading to the buffer area B2 is configured such that the extended second path is L-shaped, with the path extensions diverting from one another downstream of the interchange station IS to avoid interference between the carriers 16 directed to buffer areas B1*, B2*.

The operation of the unscrambler 1 will now be described, as well as the method of unscrambling products implemented by the unscrambler 1. Reference will be made specifically to bottle containers C with an offset neck N, but it is to be understood that any product with reference geometric features the positioning of which is susceptible of defining different product orientations can be processed according to this method and by the unscrambler 1. Therefore, while reference is made to bottle containers in the description that follows, it is to be understood that the description applying to "bottle containers" is readily applicable to whatever "product" comes to be processed by the unscrambler 1. Particularly, products that can be processed and sorted by the unscrambler 1 include packaged or enveloped products that have to be inserted into a container with a predetermined orientation (for instance, packaged diapers or pads, pre-cooked food containers that have to be stored in a dispenser shelf).

The flow SCF of scrambled bottle containers C is fed to the product input conveyor 8 by an upstream transfer conveyor, and the scrambled bottle containers in the flow SCF flow across the product picking area beneath the vision system 10 and the robots R1, R2, R3.

As anticipated, the vision system 10 is provided upstream of the linear array of the robots R1, R2, R3 and is configured to frame the scrambled bottle containers C in the flow SCF to retrieve position and orientation information of the products C in order to assist with the guidance of the robots R1, R2, R3.

Specifically, the vision system 10 is capable of determining whether a bottle container C rests on the conveyor 8 with surface S1 up (and surface S2 down) or surface S2 up (and surface S1 down), provided that the elongated shape of the bottle containers C and the random and high rate feeding by the upstream transfer conveyor make it essentially impossible to deliver a bottle container in a fully upright position.

The vision system 10 is also capable of retrieving an orientation information, i.e. an indication of the direction the longitudinal axis of the container C lies with respect to the direction of flow SCF. All of this in order to feed these data to the controller(s) of the robots R1-R3 to determine which of the containers in the flow SCF shall be picked by each of the robots R1-R3, and also to assist the robot controller(s) in providing target picking position coordinates and end effector orientation in order to pick the container based on the actual orientation thereof.

The picking of the containers C and the release of the same onto the transfer conveyor 4 results in assembling an output flow of scrambled bottle containers C on the transfer conveyor 4, wherein releasing each container C onto the output container results in a preliminary orientation of reference geometric features of the container with respect to the feeding direction F corresponding either to the first, desired, orientation, or the second, undesired, orientation. In other words, releasing each container C onto the transfer conveyor 4 comprises placing the container C—in this case in an upright position—so that the first surface S1 and the second surface S2 face outwards and laterally of the feeding direction F on opposite sides thereof, and so that the container C rests on a third surface (a base surface) which is other than the first and second surfaces S1, S2.

Here the reference geometrical features may include the first surface S1 and the second surface S2, whereby the first, desired, orientation and the second, undesired, orientation are determined by the side of the feeding direction F the first surface and the second surface face to. The neck N may be another geometric reference feature, which in this case is univocally linked to the surfaces S1, S2. In general, one or more (possibly all) of the references features mentioned herein may be relied upon when determining what to do next on the unscrambling device 6. For instance, the controller of the unscrambling device 6 may rely on the data relayed by the vision system 10 and controller of the robots R1-R3, in order to determine the preliminary orientation of the geometric reference features of the containers C on the conveyor 4.

Note that, contrary to prior art unscramblers U1 and U2, the robots R1, R2, R3 are allowed to pick any container C regardless of the orientation thereof at the picking area, i.e. regardless of whether the container lies surface S1 up or surface S2 up. An advantage of the present invention is that the product output flow on the transfer conveyor 4 can be still assembled by maintaining a certain degree of scrambling: the unscrambler device 6 will sort this out downstream of the conveyor 4. This greatly increases efficiency of the unscrambler 1 in that the number of non-processed containers C is reduced significantly or down to zero: there is no container/product in the picking area that needs to be skipped by the robots R1-R3 because of a non-optimal orientation. It is sufficient to provide a number of robots/handling devices which can keep up with the feed rate of the scrambled products through the input conveyor 8.

When the output flow of scrambled products is assembled, each product from the output flow of scrambled containers is received onto a respective carrier 16 of the product unscrambling device. Particularly, each carrier 16 takes over a product from the transfer conveyor 4 at the product input 12.

Each of the carriers 16 carrying a container C is selectively routed to the first path P1, P1* or the second path P2, P2* based on the preliminary orientation of the reference geometric features with respect to the feeding direction F.

More in detail, the operation of the unscrambling device 6 (and the unscrambling method per se) comprises:

routing the carrier 16 to the first path P1 if the preliminary orientation corresponds to the first, desired, orientation; in this case, the product C is simply fed through the unscrambling device 6 without undergoing changes in the orientation, routing the carrier 16 to the second path P2, P2* if the preliminary orientation corresponds to the second, undesired, orientation, and further routing the carrier 16 to the third path P3, P3* at the interchange station IS.

Owing to the relative position between the directions h1, h2, h3 (or *h1, *h2, *h3) and the position of the interchange station IS, routing a carrier 16 to the second path P2, P2*, then to the third path P3, P3* has the effect that the motion of the carrier 16 stops at the station IS with one orientation of the reference geometrical features—for instance trailing neck N), and departs with an opposite orientation (leading neck accordingly). In other words, a container C entering the second path P2, P2* with the second, undesired, orientation departs the station IS with the first, desired orientation.

Note also that in order to mitigate the effects of fluctuations in the feed rate of the containers C through the unscrambler 1, it may be envisaged—before routing a carrier 16 to the third path P3, P3* at the interchange station IS—routing the carrier to the first buffer area B1, B1*. This means that containers C having the second, undesired orientation may be temporarily kept at standby in the buffer area B1, B1* to lower the product feed rate at the product output 14. The containers C in the buffer area B1 can subsequently be routed back to the interchange station and on to the third path when the product feed rate at the product output 14 decreases.

Analogously, one or more carriers 16 with the respective containers C can be routed to the second buffer area B2, B2* prior to routing them on to the product output. This again allows mitigation of fluctuations in the feed rate of the products at the product output 14. In this case, retrieval of the carriers from the second buffer area B2, B2* and routing of the same to the product output 14 does not require any path change, as the third path is already connected to the product output 14.

The features of the unscrambling device 6, combined with the optional buffer areas B1, B1* and B2, B2* allow increasing the overall efficiency of the unscrambled 1 to 100%, wherein the efficiency is defined as the ratio of the output products and the number of available carrier slots. The efficiency is increased by the possibility to process all of the products on the input conveyor 8, regardless of their initial orientation, and by the possibility to temporarily keep the products at standby in the buffer areas B1, B2 (or B1*, B2*). Whenever a carrier slot becomes vacant due to a decrease in the product output flow rate, a carrier 16 can be retrieved from the buffer areas B1, B2 (or B1*, B2*) to fill the vacancy and restore 100% efficiency.

Such a high efficiency, combined with the substantial absence of product recirculation due to non-processing, also reduces the environmental impact of the unscrambler 1, as no energy input is required to sustain recirculation, and no energy is wasted in operating vacant carriers or in operating a workflow with vacant carrier slots. This renders the unscrambler 1 compliant with the most recent environmental standards.

Naturally, while the principle of the invention remains the same, the details of construction and the embodiments may widely vary with respect to what has been described and illustrated purely by way of example, without departing from the scope of the present invention.

The invention claimed is:

1. An unscrambler apparatus, comprising:
   a product picking area configured to receive a flow of scrambled products to be handled by one or more handling devices arranged at said product picking area,
   a transfer conveyor configured to receive scrambled products from the flow of scrambled products picked from the product picking area and released at the transfer conveyor by the one or more handling devices, and
   a product unscrambling device including a product input and a product output, the product unscrambling device being configured to receive the scrambled products from the transfer conveyor along a feed direction at the product input and comprising a plurality of carriers configured to take over, carry through the product unscrambling device, and release the scrambled products coming from the transfer conveyor,
   wherein:
   each of the carriers of the plurality of carriers can be selectively routed to a first path, a second path, and a third path,
   the first path extends from the product input to the product output, whereby a carrier of the plurality of carriers routed to the first path is configured to carry a scrambled product having a first, desired, orientation through the product unscrambling device and release the same at the product output thereof,
   the second path extends as a transition from a first direction of the products at the product input to a second direction incident to the first direction, wherein the second path includes an interchange station to the third path at the second direction, and wherein a carrier of the plurality of carriers routed to the second path carries a scrambled product having a second, undesired, orientation, and
   the third path extends as a transition from the second direction to a third direction at the product output, whereby a carrier of the plurality of carriers routed to the second path and carrying a scrambled product having the second, undesired, orientation is configured to be routed to the third path at the interchange station so to present the scrambled product at the product output with the first, desired, orientation.

2. The unscrambler apparatus according to claim 1, wherein the third direction is aligned with the first direction and the third direction is incident to the second direction.

3. The unscrambler apparatus according to claim 1, wherein the first direction is aligned to the feed direction of the transfer conveyor.

4. The unscrambler apparatus according to claim 1, wherein the second direction is orthogonal to the first direction.

5. The unscrambler apparatus according to claim 1, wherein the second direction is one of:
   orthogonal to the third direction, or
   aligned with the third direction.

6. The unscrambler apparatus according to claim 1, wherein the second path comprises a path extension from the interchange station to a first buffer area.

7. The unscrambler apparatus according to claim 1, wherein the third path comprises a path extension from the interchange station with the second path to a buffer area.

8. A method for unscrambling products by means of an unscrambler apparatus according to claim 1, the method including:
- assembling an output flow of scrambled products on said transfer conveyor by picking scrambled products of the outflow of scrambled products from the product picking area by the one or more handling devices, and releasing the scrambled products onto the transfer conveyor, wherein releasing each scrambled product onto the transfer conveyor results in a preliminary orientation of reference geometric features of the scrambled product with respect to the feed direction corresponding either to the first, desired, orientation, or the second, undesired, orientation,
- receiving a scrambled product from the output flow of scrambled products onto a carrier of the plurality of carriers of the product unscrambling device,
- selectively routing the carrier to the first path or the second path based on the preliminary orientation of the reference geometric features with respect to the feed direction,
- routing the carrier to the first path if the preliminary orientation corresponds to the first, desired, orientation, and
- routing the carrier to the second path if the preliminary orientation corresponds to the second, undesired, orientation, and further routing the carrier to the third path at the interchange station.

9. The method of claim 8, wherein said releasing each scrambled product onto the transfer conveyor comprises placing the scrambled product so that a first surface and a second surface face outwards and laterally of the feed direction on opposite sides thereof, and so that the scrambled product rests on a third surface which is other than the first and second surfaces,
- wherein said reference geometric features include the first surface and the second surface, whereby the first, desired, orientation and the second, undesired, orientation are determined by the side of the feed direction the first surface and the second surface face to.

10. The method of claim 8, wherein each scrambled product is a bottle container comprising a neck offset from a longitudinal axis of the bottle container, wherein said reference geometric features include said neck, whereby the first, desired, orientation and the second, undesired, orientation are determined by whether the neck of the bottle container is in a leading position or in a trailing position with respect to the feed direction.

11. The method of claim 8, further comprising, before routing the carrier to the third path at the interchange station, routing the carrier to the first buffer area.

12. The method of claim 11, wherein said routing the carrier to the third path at the interchange station comprises retrieving the carrier from the first buffer area and routing the carrier to the third path at the interchange station.

13. The method of claim 8, further comprising routing the carrier on to the product output along the third path.

14. The method of claim 13, further comprising, prior to routing the carrier on to the product output, routing the carrier to the second buffer area.

15. The method of claim 14, further comprising retrieving the carrier from the second buffer area and routing the carrier to the product output along the third path.

\* \* \* \* \*

UNITED STATES PATENT AND TRADEMARK OFFICE
CERTIFICATE OF CORRECTION

PATENT NO. : 11,932,495 B2
APPLICATION NO. : 17/683800
DATED : March 19, 2024
INVENTOR(S) : Fabrizio Faieta It is certified that error appears in the above-identified patent and that said Letters Patent is hereby corrected as shown below:

On the Title Page

(71) Applicant address information should be listed as:
- Fameccanica.Data S.p.A., San Giovanni Teatino (Chieti), ITALY -

(72) Inventor address information should be listed as:
- Fabrizio FAIETA, San Giovanni Teatino (Chieti), ITALY -

(73) Assignee address information should be listed as:
- Fameccanica.Data S.p.A., San Giovanni Teatino (Chieti), ITALY -

Signed and Sealed this
Twenty-fifth Day of February, 2025

Coke Morgan Stewart
*Acting Director of the United States Patent and Trademark Office*